US012629759B2

(12) United States Patent (10) Patent No.: US 12,629,759 B2
Sheen et al. (45) Date of Patent: May 19, 2026

(54) REVERSE FACE ANGLE GEAR CUTTER AND COOLANT DELIVERY ASSEMBLY

(71) Applicant: Eaton Intelligent Power Limited, Dublin (IE)

(72) Inventors: Benjamin S. Sheen, Schoolcraft, MI (US); Michael J. Marsden, Marshall, MI (US); Bill J. Ridge, Kalamazoo, MI (US); Alex Abernethy, Maiden, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 1042 days.

(21) Appl. No.: 17/720,844

(22) Filed: Apr. 14, 2022

(65) Prior Publication Data

US 2022/0234125 A1 Jul. 28, 2022

Related U.S. Application Data

(63) Continuation of application No. PCT/EP2020/025459, filed on Oct. 16, 2020.

(Continued)

(51) Int. Cl.
*B23F 23/12* (2006.01)
*B23C 5/08* (2006.01)
(Continued)

(52) U.S. Cl.
CPC ................ *B23F 23/12* (2013.01); *B23C 5/28* (2013.01); *B23F 5/163* (2013.01); *B23Q 11/1023* (2013.01)

(58) Field of Classification Search
CPC . B23Q 11/1046; B23Q 11/1023; B23F 23/12; B23F 23/00; B23C 5/28
See application file for complete search history.

(56) References Cited

U.S. PATENT DOCUMENTS 559,012 A * 4/1896 Warren .................. B64C 11/04
411/401
1,400,021 A * 12/1921 Gordon .................. B23D 77/02
408/57

(Continued)

FOREIGN PATENT DOCUMENTS

CN 1152888 6/1997
DE 9017723 U1 12/1991
(Continued)

OTHER PUBLICATIONS

International Search Report and Written Opinion for International Application No. PCT/EP2020/025459 mailed Apr. 26, 2021.

*Primary Examiner* — Sara Addisu
(74) *Attorney, Agent, or Firm* — Squire Patton Boggs (US) LLP

(57) ABSTRACT

A coolant delivery assembly configured for use with a gear cutter tool that cuts gear teeth into a workpiece to form a gear includes a retaining cooling nut, a tool holder and a coupling member. The retaining cooling nut has a nut body that defines a plurality of coolant flow passages therein. The tool holder supports the gear cutter tool. The coupling member couples the retaining cooling nut to the mount. The retaining cooling nut is configured to receive coolant and deliver the coolant through the plurality of coolant flow passages and direct the coolant toward the gear cutter tool.

8 Claims, 11 Drawing Sheets

Related U.S. Application Data

(60) Provisional application No. 63/001,884, filed on Mar. 30, 2020, provisional application No. 62/916,490, filed on Oct. 17, 2019.

(51) Int. Cl.

| | |
|---|---|
| *B23C 5/28* | (2006.01) |
| *B23F 5/16* | (2006.01) |
| *B23F 21/00* | (2006.01) |
| *B23Q 11/10* | (2006.01) |

(56) References Cited

U.S. PATENT DOCUMENTS

| | | | | |
|---|---|---|---|---|
| 1,484,207 | A * | 2/1924 | Campbell | B23C 5/2462 |
| | | | | 407/45 |
| 2,080,401 | A * | 5/1937 | Heard | B23F 21/22 |
| | | | | 407/11 |
| 2,807,443 | A * | 9/1957 | Wyman | E21B 10/38 |
| | | | | 175/426 |
| 3,597,817 | A * | 8/1971 | Whalley | B23C 5/1054 |
| | | | | 407/30 |
| 4,322,189 | A * | 3/1982 | Briese | B23Q 1/0036 |
| | | | | 408/59 |
| 5,290,135 | A * | 3/1994 | Ball | B23Q 11/10 |
| | | | | 407/11 |
| 7,673,706 | B2 * | 3/2010 | Simmons | E21B 10/40 |
| | | | | 175/57 |
| 8,708,611 | B2 * | 4/2014 | Marshansky | B23C 5/1072 |
| | | | | 408/226 |
| 10,710,173 | B2 * | 7/2020 | Ericson | B23C 5/08 |
| 10,850,336 | B2 * | 12/2020 | Henry | B23C 5/06 |
| 11,027,343 | B2 * | 6/2021 | Mayer | B23C 5/28 |
| 11,541,499 | B2 * | 1/2023 | Fang | B23C 5/28 |
| 12,064,823 | B2 * | 8/2024 | Schmid | B23C 5/06 |
| 2002/0009339 | A1 * | 1/2002 | Arvidsson | B23C 5/006 |
| | | | | 407/43 |
| 2002/0106251 | A1 * | 8/2002 | Ripley | B23C 5/28 |
| | | | | 407/43 |
| 2009/0226268 | A1 * | 9/2009 | Pilkington | B23C 5/28 |
| | | | | 407/113 |
| 2011/0262232 | A1 * | 10/2011 | Chen | B23C 5/109 |
| | | | | 407/46 |
| 2011/0262234 | A1 * | 10/2011 | Schuffenhauer | B23D 77/006 |
| | | | | 408/56 |

| | | | | |
|---|---|---|---|---|
| 2012/0141220 | A1 * | 6/2012 | Chen | B23Q 11/1023 |
| | | | | 409/136 |
| 2012/0230781 | A1 * | 9/2012 | Hoffer | B23Q 11/1023 |
| | | | | 407/11 |
| 2012/0275876 | A1 * | 11/2012 | Lehto | B23C 5/28 |
| | | | | 409/137 |
| 2013/0045059 | A1 * | 2/2013 | Bozkurt | B23C 5/06 |
| | | | | 407/53 |
| 2013/0243540 | A1 | 9/2013 | Schaffeld | |
| 2015/0063927 | A1 * | 3/2015 | Sjoo | B23F 5/163 |
| | | | | 407/115 |
| 2015/0078851 | A1 * | 3/2015 | Liepelt | B23C 5/28 |
| | | | | 407/11 |
| 2015/0298225 | A1 * | 10/2015 | Ueno | B64C 1/12 |
| | | | | 407/56 |
| 2016/0023288 | A1 * | 1/2016 | Morrison | B23C 5/28 |
| | | | | 407/11 |
| 2016/0039016 | A1 * | 2/2016 | Waggle | B23C 5/28 |
| | | | | 407/11 |
| 2016/0107284 | A1 * | 4/2016 | Haimer | B23B 31/10 |
| | | | | 279/20 |
| 2016/0297042 | A1 * | 10/2016 | Koik | B23C 5/28 |
| 2017/0252839 | A1 * | 9/2017 | Donisi | B22F 5/10 |
| 2017/0266734 | A1 * | 9/2017 | Schuffenhauer | B23D 77/02 |
| 2018/0001405 | A1 * | 1/2018 | Natsuda | B23F 23/12 |
| 2018/0354047 | A1 | 12/2018 | Sato et al. | |
| 2019/0015912 | A1 | 1/2019 | Mayer et al. | |
| 2019/0217405 | A1 | 7/2019 | Uno | |
| 2022/0324037 | A1 * | 10/2022 | Gangstad | B23C 5/26 |
| 2023/0398619 | A1 * | 12/2023 | Sheen | B23F 5/163 |

FOREIGN PATENT DOCUMENTS

| | | | | | |
|---|---|---|---|---|---|
| DE | 4416380 | A1 * | 11/1995 | | B23C 5/006 |
| DE | 102009008308 | A1 * | 2/2010 | | B23C 5/28 |
| DE | 102009003601 | A1 | 9/2010 | | |
| DE | 102015112631 | A1 * | 2/2016 | | B23C 5/006 |
| DE | 102014012481 | A1 * | 3/2016 | | B22F 10/28 |
| DE | 102015115283 | A1 * | 3/2016 | | B23C 5/006 |
| DE | 102017114088 | A1 * | 1/2018 | | B23F 23/12 |
| DE | 102018113323 | | 12/2018 | | |
| EP | 2832493 | A1 | 2/2015 | | |
| EP | 2999566 | A1 | 3/2016 | | |
| EP | 3272448 | A1 | 1/2018 | | |
| FR | 1447376 | A | 7/1966 | | |
| JP | 02269513 | A * | 11/1990 | | |
| SU | 876372 | A1 | 10/1981 | | |
| WO | WO-2010128930 | A1 * | 11/2010 | | B23C 5/28 |

* cited by examiner

232

208

332

308

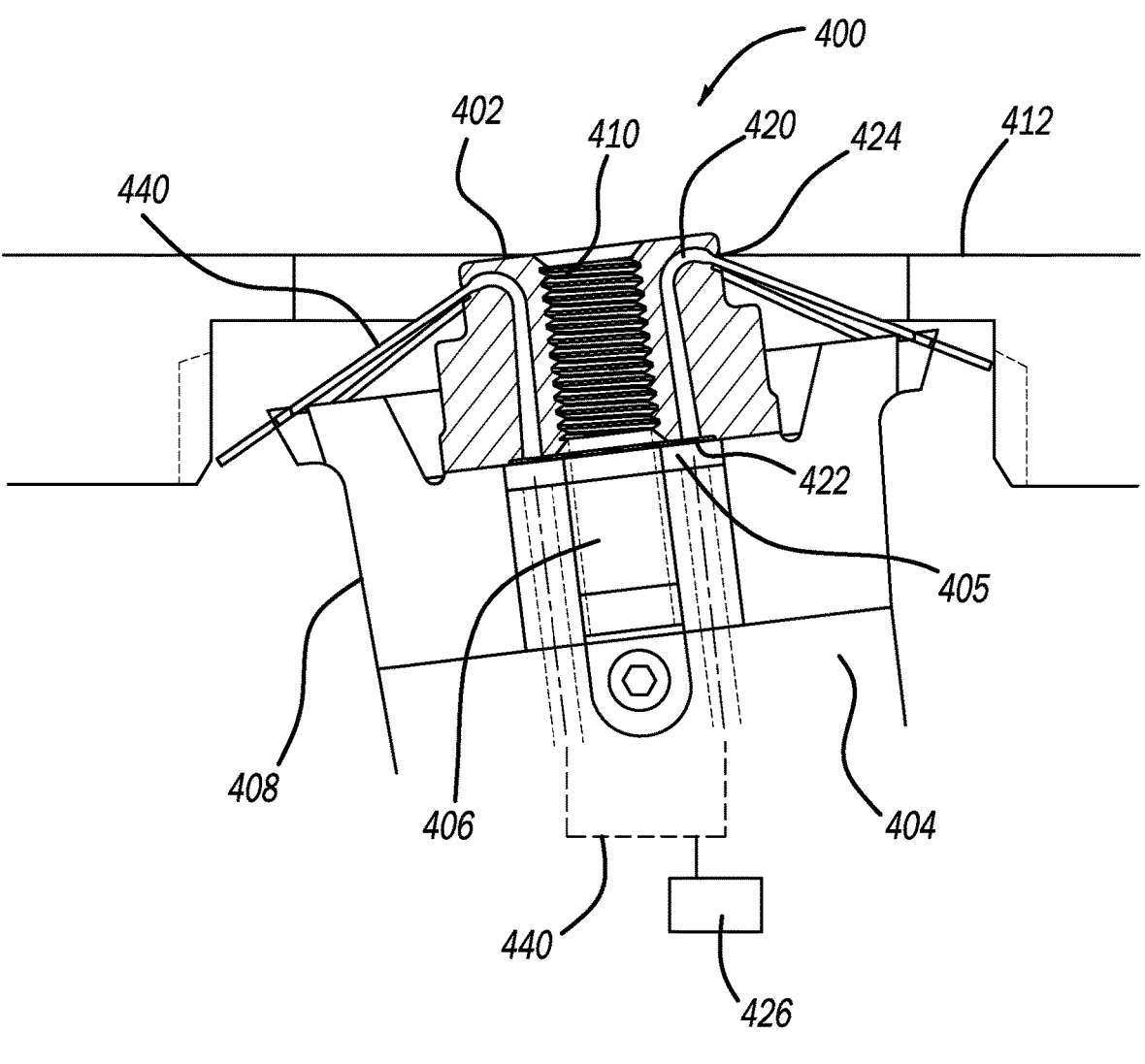
_FIG - 12_

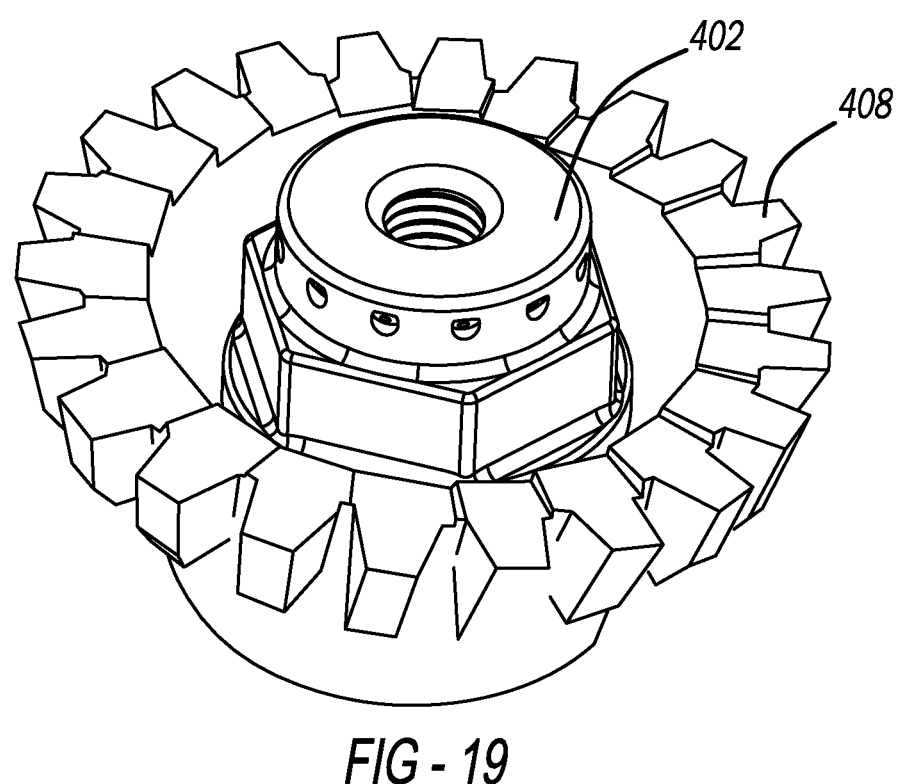
_FIG - 19_
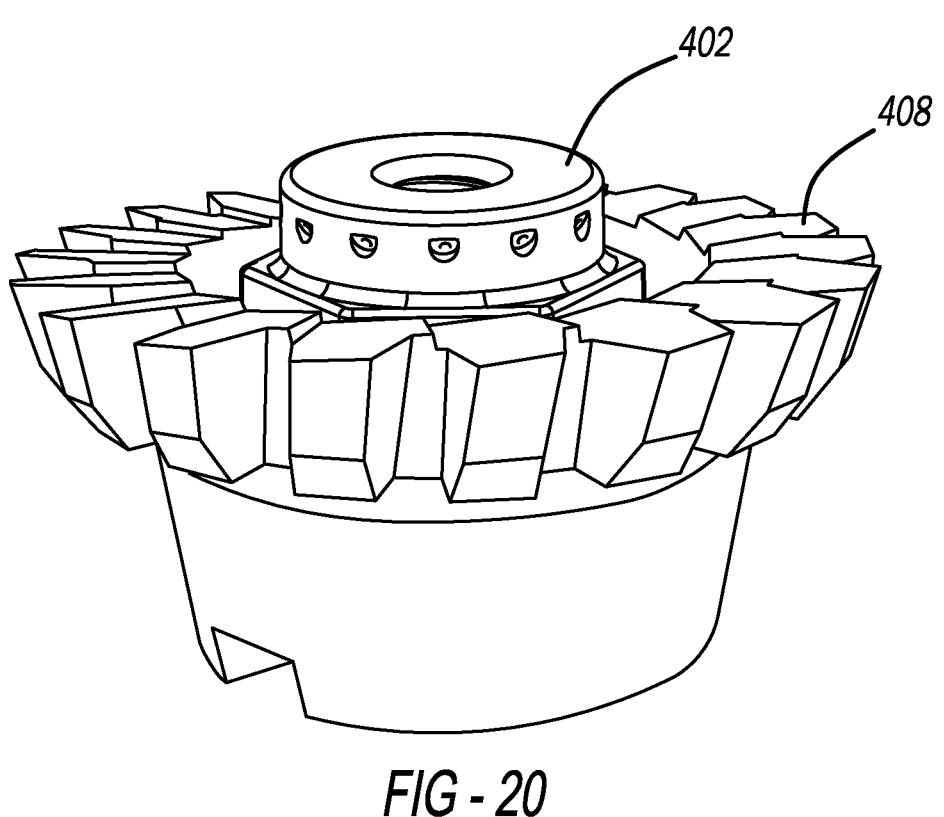
_FIG - 20_

REVERSE FACE ANGLE GEAR CUTTER AND COOLANT DELIVERY ASSEMBLY

CROSS-REFERENCE TO RELATED APPLICATIONS

This application is a continuation of International Application No. PCT/EP2020/025459 filed Oct. 16, 2020, which claims the benefit of U.S. Patent Application No. 62/916,490 filed Oct. 17, 2019 and U.S. Patent Application No. 63/001,884 filed Mar. 30, 2020. The disclosures of the above applications are incorporated herein by reference.

FIELD

The present disclosure relates generally to a gear cutter that forms gear teeth on an inner diameter of a working piece and a related coolant delivery assembly.

BACKGROUND

Gear manufacturers utilize various machining processes and corresponding tools to produce gears. Exemplary processes can include hobbing, shaping, milling, shear cutting and grinding. The process selected by the gear manufacturer can depend on the type of gear being machined and the tolerances within which the gear is produced. Other considerations in selecting the method can include the size of the gear, the configuration of internal sections or flanges, the quantity of gears to be produced, and gear-to-pinion ratio and costs.

Gear teeth adjacent to other part features are currently limited to production methods such as shaping or rack rolling. For internal gear teeth, shaping or broaching are the traditional manufacturing methods, but each process is limited to the part type. In other words, broaching must have a completely un-obstructed part layout so the tool can pass completely through the part. Gear shaping allows teeth to be cut against an interfering surface, but is inherently slow in terms of machine cycle and flexibility.

Gear skiving is a recent development in gear manufacturing that reduces traditional gear shaping cycle times by up to 80%. While extremely fast, traditional skiving is limited to cutter clearances and part configurations.

SUMMARY

A coolant delivery assembly configured for use with a gear cutter tool that cuts gear teeth into a workpiece to form a gear includes a retaining cooling nut, a tool holder and a coupling member. The retaining cooling nut has a nut body that defines a plurality of coolant flow passages therein. The tool holder supports the gear cutter tool. The coupling member couples the retaining cooling nut to the mount. The retaining cooling nut is configured to receive coolant and deliver the coolant through the plurality of coolant flow passages and direct the coolant toward the gear cutter tool.

In other features, the nut body further comprises an engaging end that is configured to engage the gear cutter tool and an opposite end. Each flow passage of the plurality of flow passages defines a coolant inlet and a coolant outlet. Each coolant inlet is defined at the engaging end. The plurality of coolant flow passages each define a linear portion and an arcuate portion. The linear portions communicate coolant from the engaging end toward the opposite end. The arcuate portions route the coolant from the linear portions in a direction toward the cutting tool away from the opposite end.

According to additional features the coolant delivery assembly further includes a plenum disposed between the tool holder and the engaging end of the retaining cooling nut. The plenum is configured to provide circumferential coolant communication between the tool holder and the engaging end of the retaining cooling nut. The retaining cooling nut secures the gear cutter tool to the tool holder. The coolant delivery assembly can further include the gear cutter tool. The gear cutter tool has a plurality of cutting teeth. Each cutting tooth of the plurality of cutting teeth has a tooth face that defines a tooth face angle relative to the workpiece during cutting into the workpiece wherein the tooth face angle is non-parallel relative to the workpiece. The tooth face angle is sloped to the left relative to a rotational axis of the gear cutter tool.

A method of forming a gear using a gear cutter tool and a retaining cooling nut that retains the gear cutter relative to the tool holder is provided. The gear cutter tool is coupled relative to the tool holder with the retaining cooling nut. The gear cutter tool has a cutting face. The gear cutter tool is advanced into engagement with the gear while rotating the gear cutter tool around an axis of rotation. Coolant is delivered through at least one coolant passage defined in the retaining cooling nut. Coolant flows through the at least one coolant passage and out a coolant outlet in a direction toward the cutting face such that coolant is sprayed directly onto the cutting face.

According to additional features, coolant is delivered through a plurality of coolant passages defined in the retaining cooling nut. Each coolant passage of the plurality of coolant passages has a respective coolant passage that directs coolant onto the cutting face. Coolant is delivered through a plenum disposed between the tool holder and the engaging end of the retaining nut. The plenum is configured to provide circumferential coolant communication between the tool holder and the engaging end of the retaining cooling nut.

In other features, the gear is cut with the gear cutter tool during the delivering of coolant through the plenum. The gear cutter tool is rotated around the axis of rotation. Teeth formed on the gear cutter tool have a tooth face that defines a tooth face angle relative to the gear during cutting into the gear. The tooth face angle is non-parallel relative to the gear. The tooth face angle is sloped to the left relative to a rotational axis of the gear cutter tool.

A gear cutter tool for cutting internal gear teeth into a workpiece to form a gear is provided. The gear cutter tool has a plurality of cutting teeth. Each cutting tooth of the plurality of cutting teeth has a tooth face that defines a tooth face angle relative to the workpiece during cutting into the workpiece. The tooth face angle is non-parallel relative to the workpiece. The tooth face angle is sloped to the left relative to a rotational axis of the gear cutter tool.

BRIEF DESCRIPTION OF THE DRAWINGS

The present disclosure will become more fully understood from the detailed description and the accompanying drawings, wherein:

FIG. 12 is a schematic illustration of a coolant delivery assembly constructed in accordance to one example of the present disclosure and shown delivering coolant toward an exemplary cutting tool;

FIG. 19 is a top perspective view of a retaining cooling nut constructed in accordance to the present disclosure and shown adjacent to an exemplary cutting tool; and FIG. 20 is a side perspective view of the retaining cooling nut and cutting tool of FIG. 19.

DETAILED DESCRIPTION

Figure 1A:
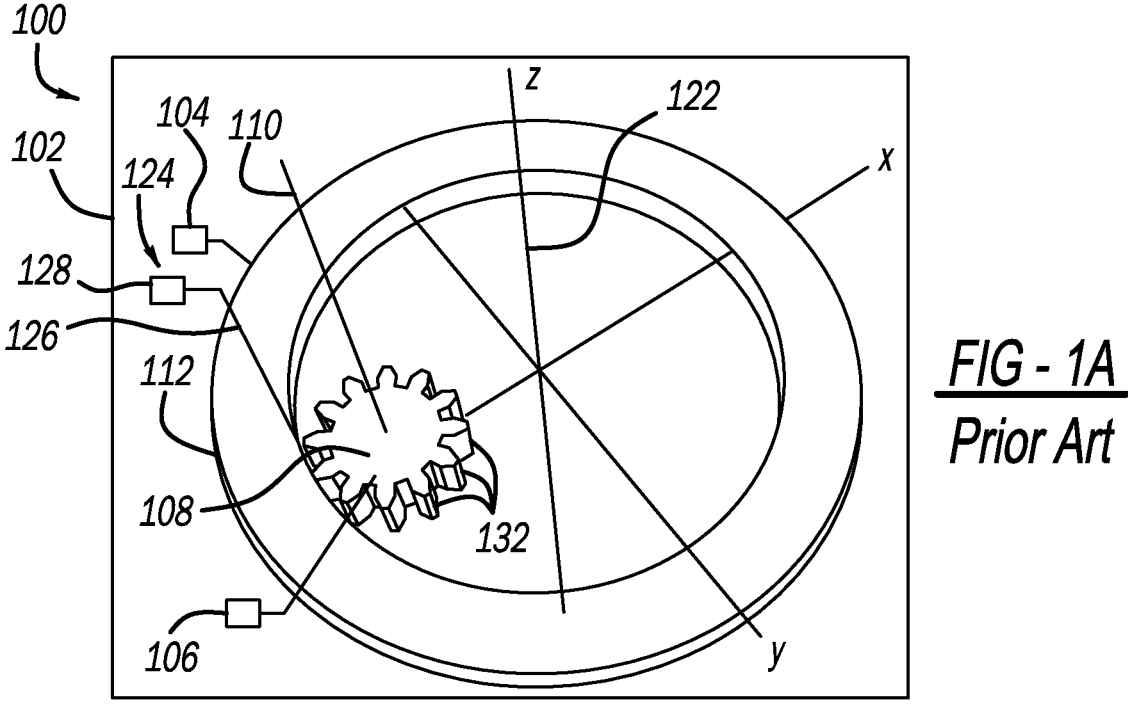
FIG. 1A is a schematic, perspective view of an exemplary prior art gear cutter system including a gear cutter that is configured to cut an internal gear in a blank orientation.
Figure 1B:
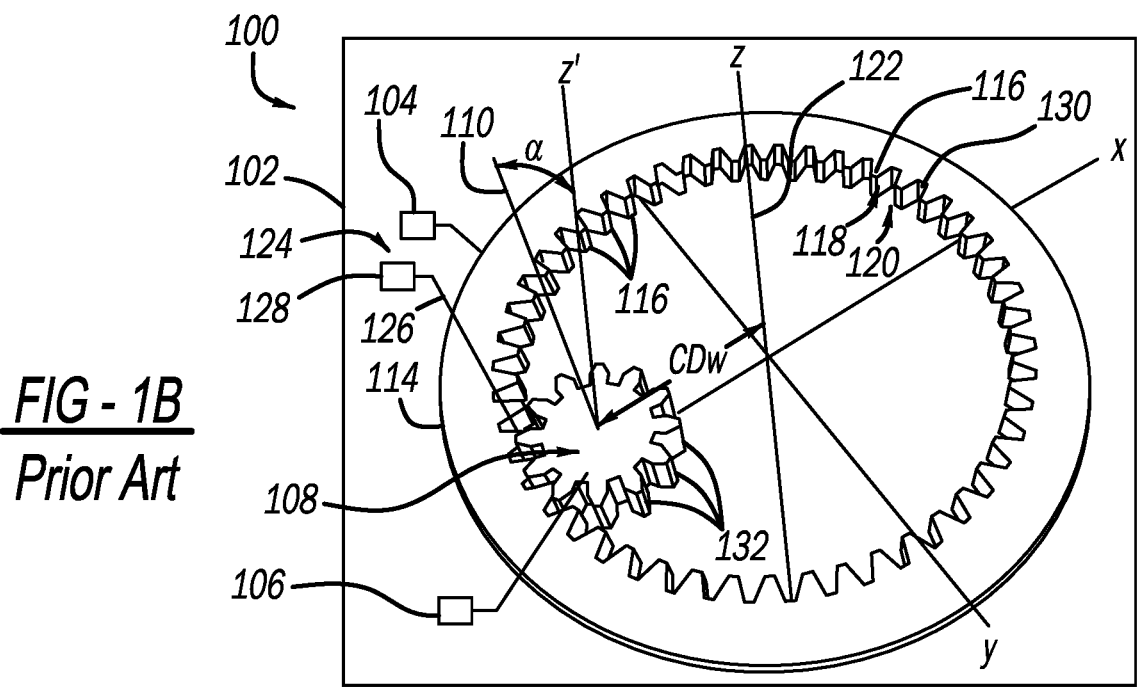
FIG. 1B is a schematic, perspective view of the system of FIG. 1A, illustrating the cutter having produced a precision internal gear in a final orientation.
Figure 2:
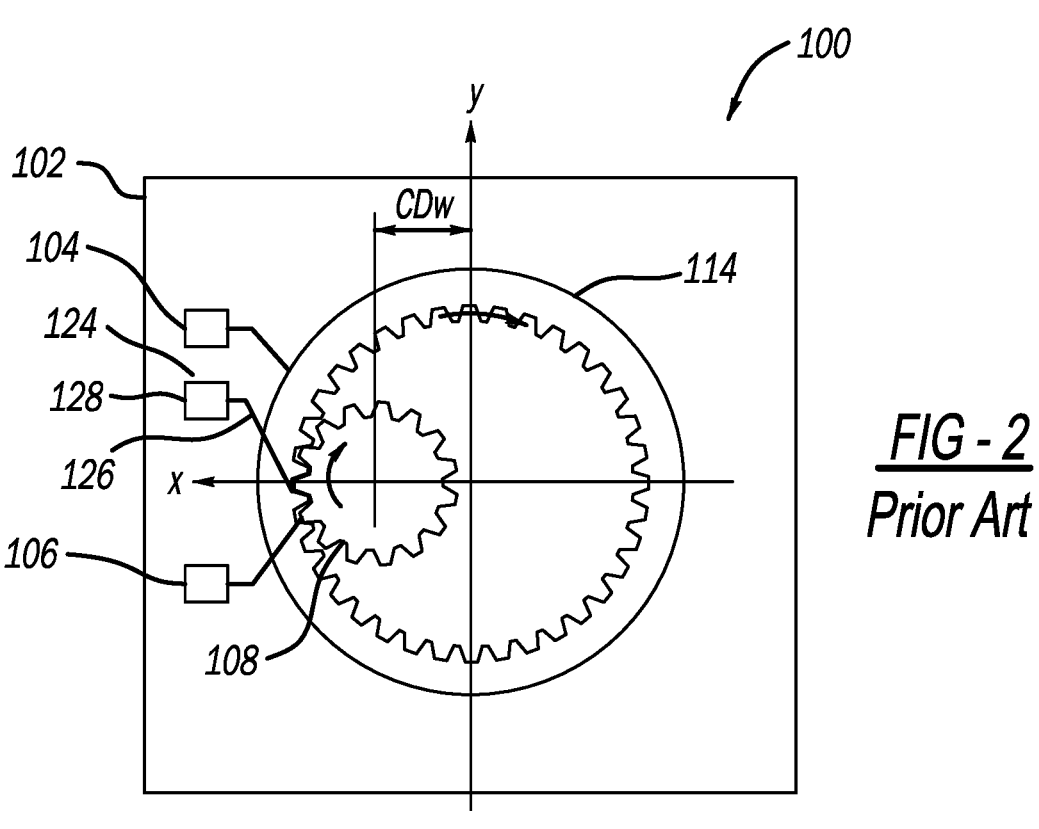
FIG. 2 is a schematic end view of the system of FIG. 1A, illustrating a center distance between an axis of rotation of the cutter and an axis of rotation of the internal gear.
Figure 3:
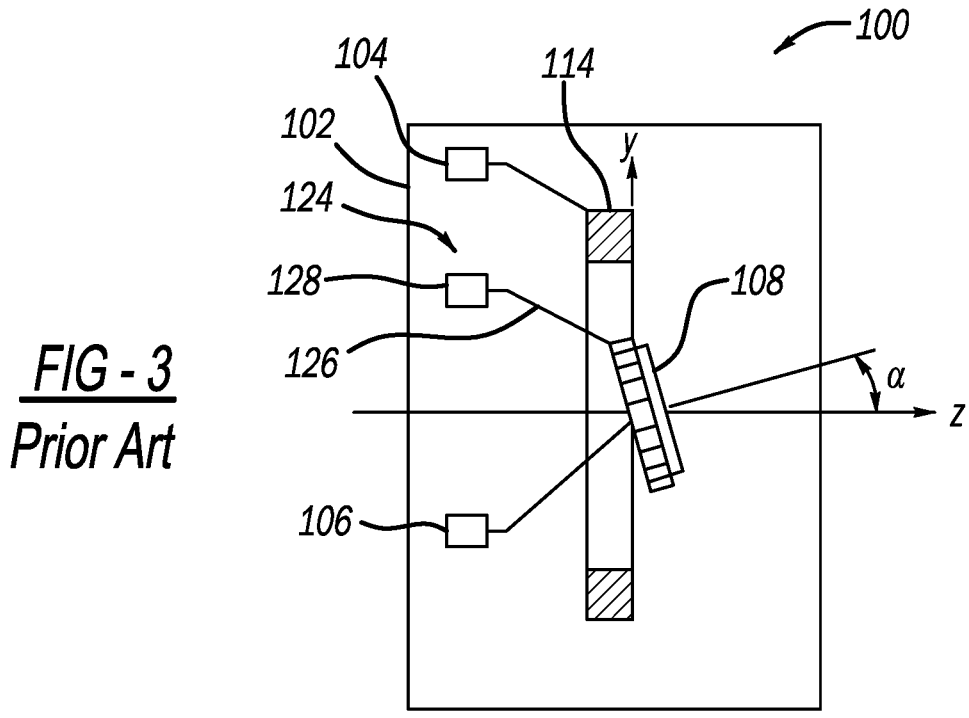
FIG. 3 is a schematic side view of the cutter and the internal gear of FIG. 1A, illustrating a cross-axis angle between an axis of rotation for the cutter and an axis of rotation for the internal gear.
Figures 4, 5:
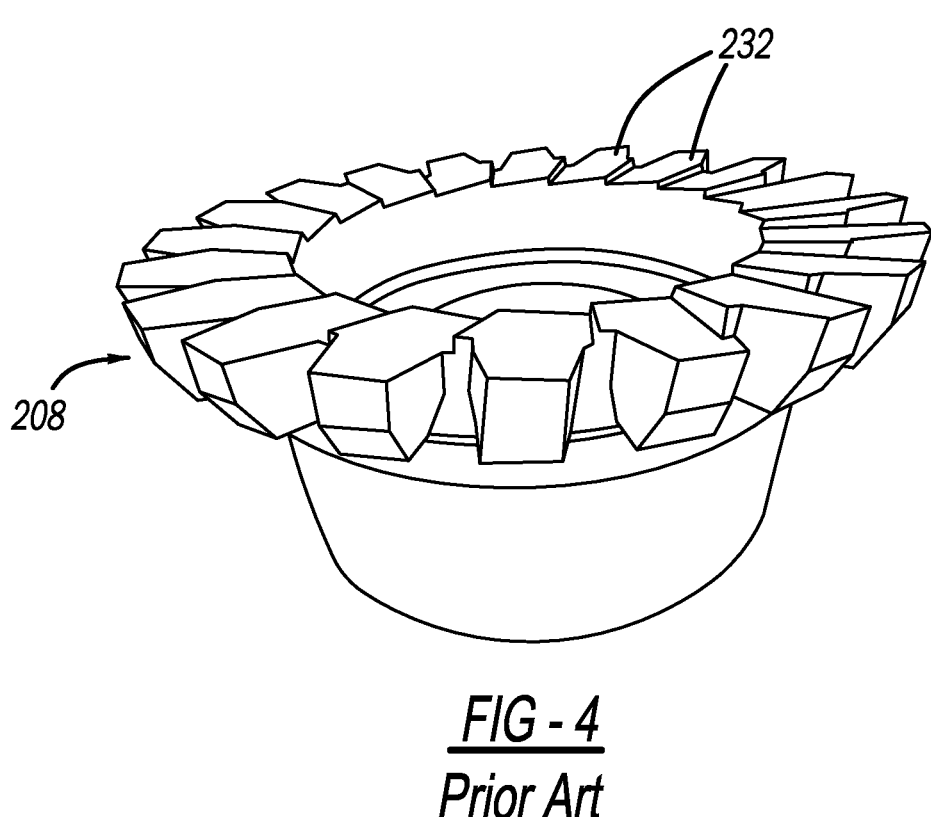
FIG. 4 is a side perspective view of an exemplary gear cutter according to another prior art example.
FIG. 5 is a side perspective view of an exemplary gear cutter according to one example of the present disclosure.

An exemplary involute gear cutter system (hereinafter "system") includes a computer numerically controlled (CNC) lathe and modified tooth proportion gear cutter (hereinafter "cutter") configured to cut a gear in a blank orientation to remove shavings from the gear in multiple passes so as to produce a precision gear in its final orientation. The CNC lathe includes a chuck and an active sub-spindle, i.e. controlled rotating motion through CNC controls. The cutter can be mounted on the spindle, and the gear in the blank configuration may be attached to the chuck. More specifically, the cutter can have a plurality of cutting teeth, and each one of the cutting teeth can have a pair of cutting edges configured to cut the gear in the blank orientation to provide the gear in the final orientation.

In the final orientation, the gear has an involute tooth profile including a plurality of cut teeth and a plurality of valleys therebetween. The cutting edges may be configured to cut the gear in the blank orientation, such that the gear in the final orientation includes an active profile section and an operating pitch diameter that are spaced apart from one another. Thus, the cutter can apply a generally constant force in a single or unilateral direction along the surface of the gear to increase the accuracy of machining the gear within, for example, a 0.0010 inch tolerance, without requiring special cutting tools or cutting systems.

Referring to FIGS. 1A-3, an exemplary prior art system 100 includes a computer numerically controlled (CNC) lathe 102 having in part a chuck 104 and a spindle 106. The system 100 further includes a cutter 108 that is attached to the spindle 106, which is in turn configured to rotate the cutter 108 about a cutting axis 110 so as to cut a gear 112 in a blank orientation (FIG. 1A) and produce the gear 114 in the final orientation (FIG. 1B). The cutter 108 in this form is an external gear configured to cut an internal gear 112 in a blank orientation to produce the internal gear 114 in the final orientation. The internal gear 114 in the final orientation has a plurality of cut teeth 116. The teeth 116 have an involute tooth profile 118 including an active profile section 120, which is a portion of each tooth surface configured to contact the opposing teeth of a meshed gear.

The gear 112 in the blank orientation is mounted to the chuck 104, which is configured to rotate the gear 112 about a cut axis 122 (FIG. 1A), such that the cut axis 122 and the cutting axis 110 are spaced apart from one another by a center distance CDw. In addition, the cut axis 122 and the cutting axis 110 are disposed at a cross-axis angle a with respect to one another when the gear 114 is in the final orientation. As used herein, the term "cross-axis" is an angle that defines the difference between the two rotational axes of the gear workpiece and the cutting tool.

The system 100 can further include a flushing device 124 configured to deliver a fluid to the gear 112 to remove shavings, chips or dust from the gear 112 when the spindle 106 rotates the cutter 108 to cut the gear 112 in multiple passes. The fluid can also remove heat from the system 100. In one example, the flushing device 124 is a fluid line 126 communicating with a reservoir 128 to supply water, nitrogen gas or another fluid to the external gear 112. In the final orientation, the gear 114 has an involute tooth profile including a plurality of cut teeth 116 and a plurality of valleys therebetween. The involute tooth profile 118 includes the active profile section 120, and the operating pitch diameter is spaced apart from the same when the gear 114 is in its final orientation. Additional description of a prior art skiving tool may be found in commonly owned U.S. Pat. No. 10,016,827 the contents of which are expressly incorporated herein by reference.

The present disclosure allows the skiving of gear teeth previously not possible with current methods due to its ability to cut against interfering part geometries and can eliminate certain cutter/workpiece interferences. For particular gear components such as Heavy Duty Transmission mainshaft gears, the internal clutch teeth design in combination with the integral thrust washer provides a compact product design. In order to manufacture the clutch teeth, gear shaping is the only current method of production possible. As machine technology advances, the gear shaping machine has now become the constraint machine within production cells and manufacturing output is limited by the shaping process. Gear skiving can remove this constraint machine within the cell layout and reduce gear machining cycle times by approximately 50% for mainshaft gears. The present disclosure facilitates improvements in part geometry and cutter tool life which can allow gear skiving in a production environment feasible.

During the gear skiving, the evacuation of chips is critical for the skiving process to be successful. Without successful chip evacuation, excessive tool wear, and even tool failure can occur very rapidly. For example, in one prior art skiving method, chips can be generated at a rate of 700 chips per second. Any stray chips that get reintroduced into the cutting zone can cause cutting edge damage on the tool or if severe enough can cause a catastrophic tool failure. The present disclosure provides an assembly and chip evacuation method that provides improved chip evacuation during the skiving process.

Figure 6:
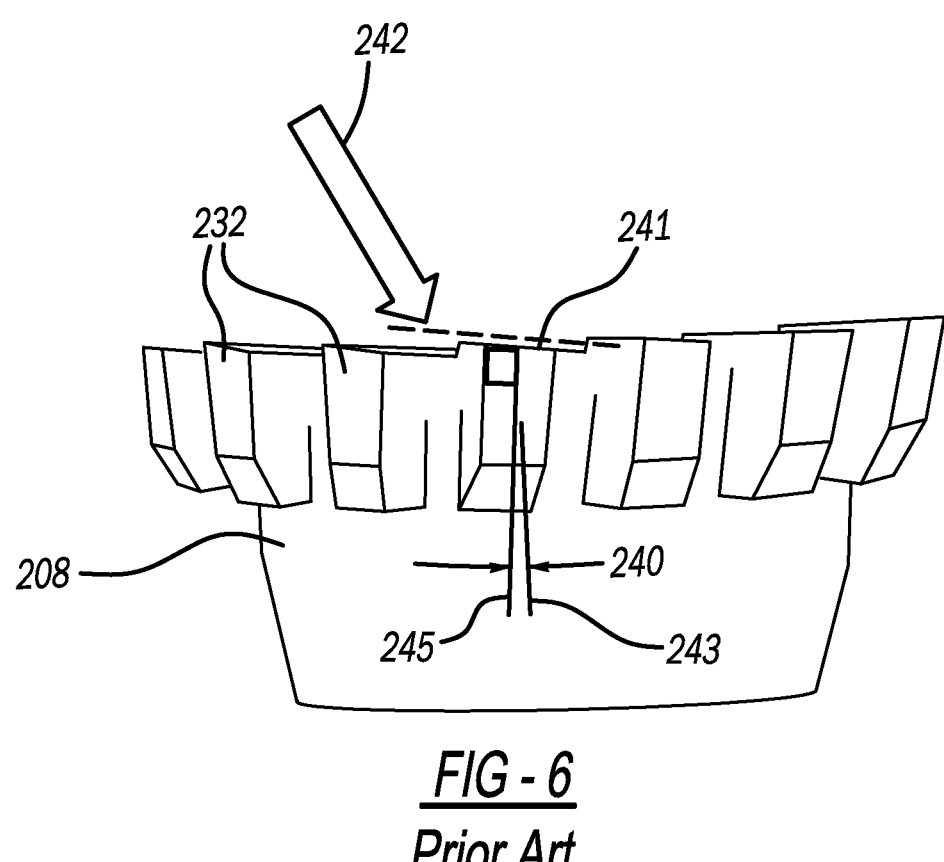
FIG. 6 is an enlarged view of the active profile section of the exemplary prior art gear cutter of FIG. 4.
Figure 7:
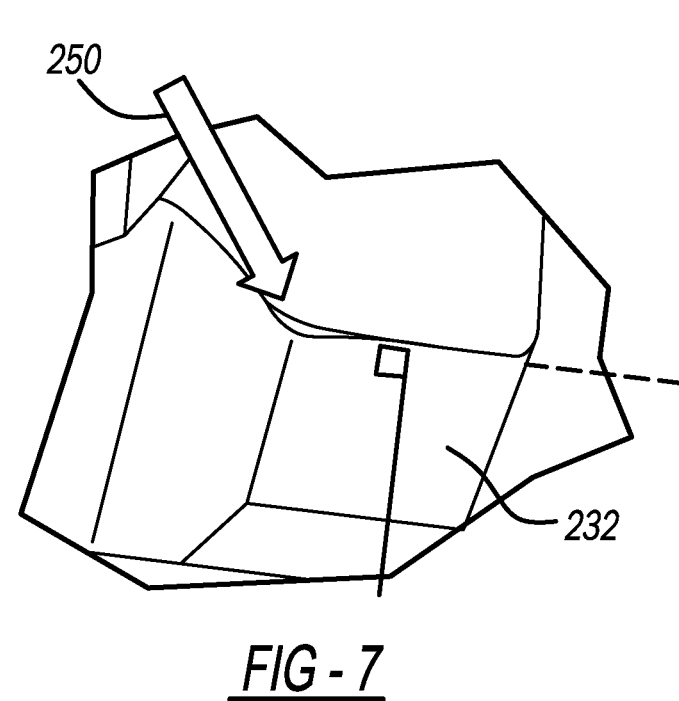
FIG. 7 is a detail view of a tooth of the prior art gear cutter of FIG. 6.
Figure 8:
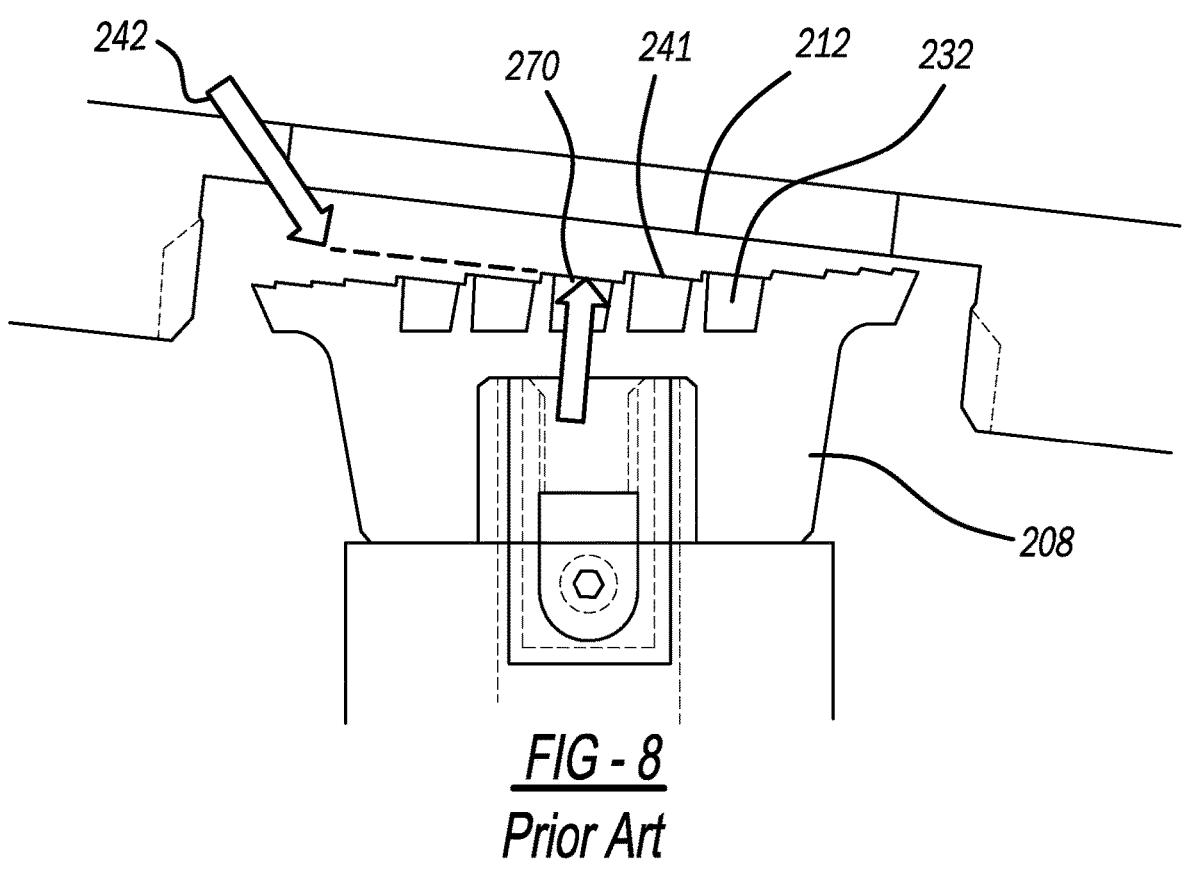
FIG. 8 is a side schematic view of the prior art gear cutter of FIG. 4.

With reference now to FIGS. 4, 6, 7 and 8, a gear cutter constructed in accordance to one prior art example is shown and generally identified at reference 208. The gear cutter 208 includes a plurality of teeth 232. Each tooth 232 defines a helix angle 240. The helix angle 240 is defined as an angle formed between a centerline or cut axis 243 of the gear cutter 208 and a line 245 transverse to a tooth face 241. The tooth face 241 has a tooth face angle 242 relative to the workpiece 212 (FIGS. 6 and 8). The tooth face angle 242 is perpendicular to the helix angle 240. The tooth face angle 242 slopes downward and to the right as viewed from the cut axis 243 of the gear cutter 208. In some examples, the configuration of the gear cutter 208 can experience localized or accelerated tool wear indicated generally at reference 250, FIG. 7. As shown in FIG. 8, the tooth face angle 242 is parallel to a workpiece 212. The workpiece 212 is cut at the location shown by the arrow by the teeth 232. During cutting, both the gear cutter 208 and the workpiece 212 are rotating, but at different revolutions per minute (RPM).

Figure 9:
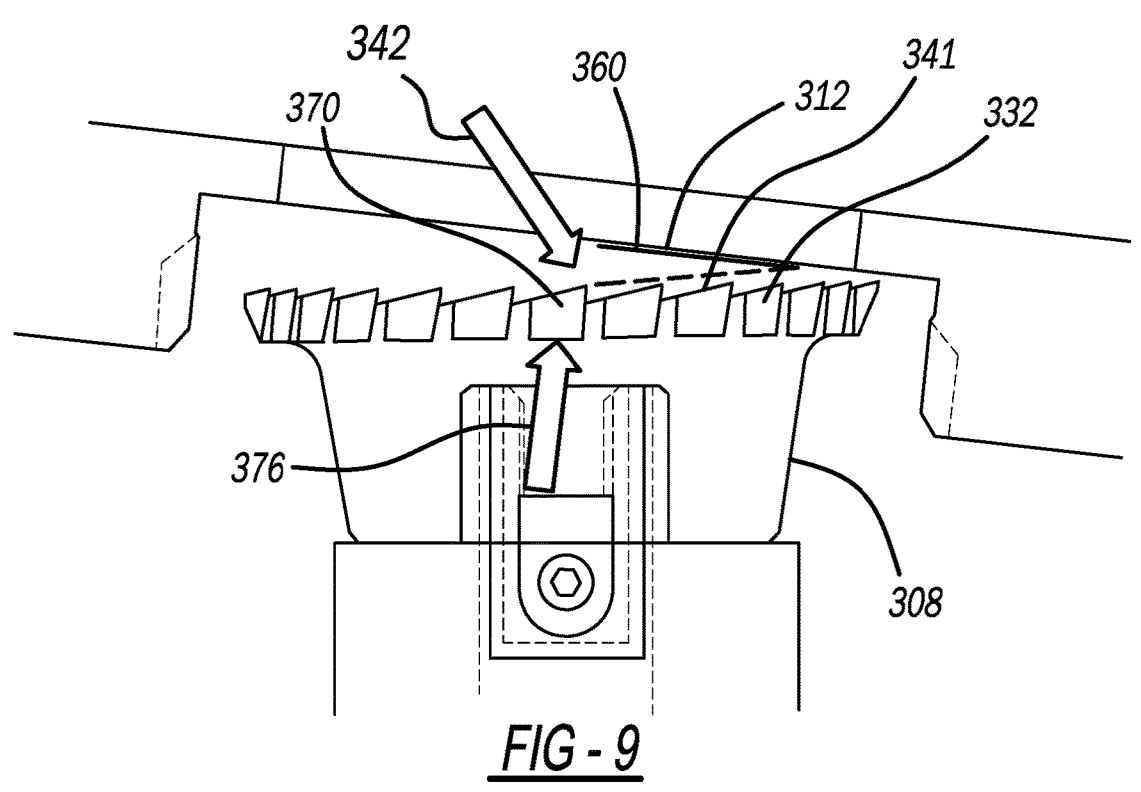
FIG. 9 is a side schematic view of the gear cutter of FIG. 5 according to one example of the present disclosure.

With reference to FIGS. 5 and 9-11, a gear cutter constructed in accordance to one example of the present disclosure is shown and generally identified at reference 308. The gear cutter 308 includes a plurality of teeth 332. Each tooth 332 defines a tooth face 341 and a tooth face angle 342 relative to the workpiece 312 (FIG. 9). The tooth face angle 342 is an angle defined between the tooth face 341 and a face of the workpiece 312. The tooth face angle 342 is sloped downward and to the left relative to a rotational axis 394 of the cutting tool 308. Explained further, the tooth face angle 342 is sloped in an opposite direction as compared to the tooth face angle 242. In this regard, the tooth face angle 342 defines a cut angle 360 that is not parallel to the workpiece 312 during cutting. The grind of the gear cutter 308 is angled differently as compared to the gear cutter 208. More cutting occurs by providing a cut angle 360 as compared to the parallel relationship of the face angle 242 and workpiece 212 shown in FIG. 8.

Figures 10, 11:
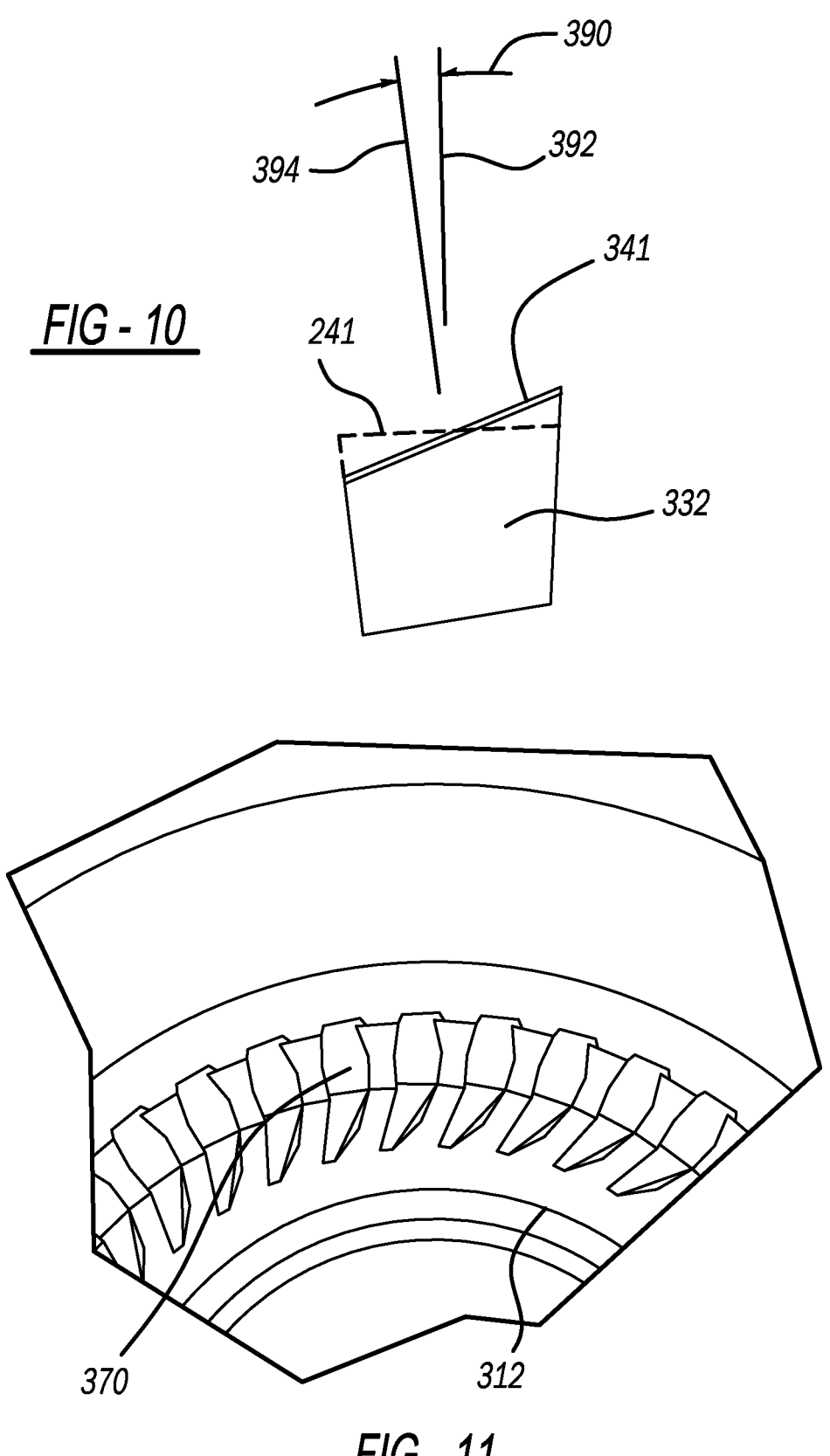
FIG. 10 is a schematic illustration of a proposed tooth surface superimposed over a traditional tooth leading surface.
FIG. 11 is a partial side view of teeth formed on a workpiece with the exemplary gear cutter of FIG. 5.

The workpiece 312 is cut at arrow called 376 (internal spline of workpiece FIG. 11) by the teeth 332. During cutting, both the gear cutter 308 and the workpiece 312 are rotating, but at different RPM. In one example, the workpiece 312 can be tilted while the cutting tool 308 is advanced linearly along the tool feed direction 376 toward the workpiece 312. In the example shown twenty-two teeth 332 are provided on the gear cutter 308. In this regard, with each full rotation of the gear cutter 308, twenty-two slivers of workpiece material are sequentially cut away from the workpiece 312. As shown in FIG. 10, a cutter cross-axis 390 is defined between a first rotational axis 392 of the workpiece 312 and a second rotational axis 394 of the cutting tool 308.

Additional advantages of the instant gear cutter 308 and related system for cutting the internal gear teeth or splines of a gear are realized by the instant disclosure. For example, the cutting action can be at a more aggressive angle without requiring the workpiece to be tilted more. The amount of time necessary for the gear cutter to operate in a negative rake angle condition is reduced. As a result, tool life is improved and costs are reduced. The geometry of the gear cutter 308 balances the active lengths of both gear flanks. This creates a more useable tooth length for more compact product designs. The gear cutter 308 is able to generate gear teeth closer to blind shoulders. This shortens the overall width of gear teeth which yields an increase in power-density for a geartrain system, or more power transferred per volume of the system.

Figures 13, 14:
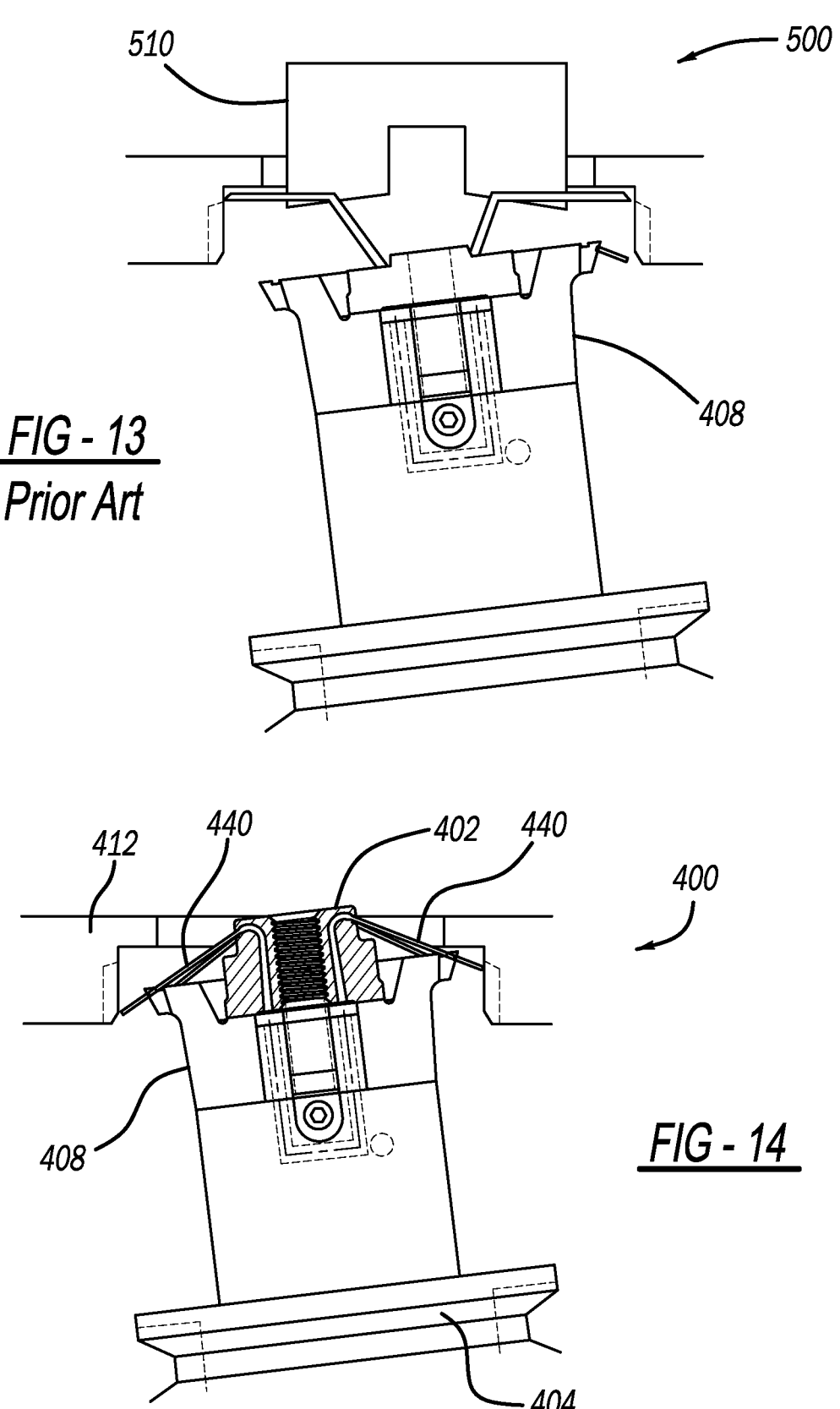
FIG. 13 is a schematic illustration of a coolant delivery assembly constructed in accordance to Prior Art.
FIG. 14 is another schematic illustration of the coolant delivery assembly of the present disclosure.
Figure 15:
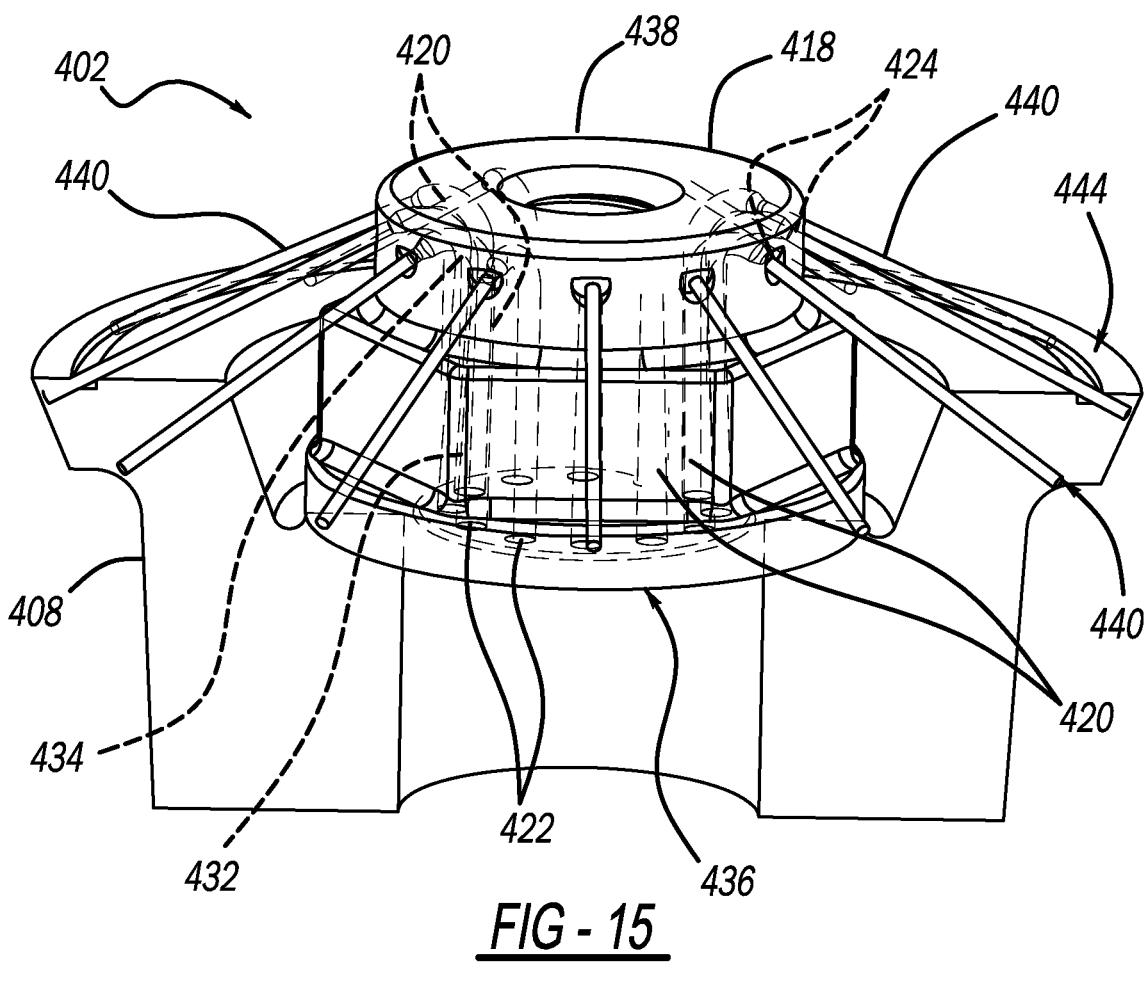
FIG. 15 is a perspective view of a retaining cooling nut of the coolant delivery assembly of FIG. 12, the retaining cooling nut shown retaining an exemplary cutting tool shown in partial section view.
Figure 16:
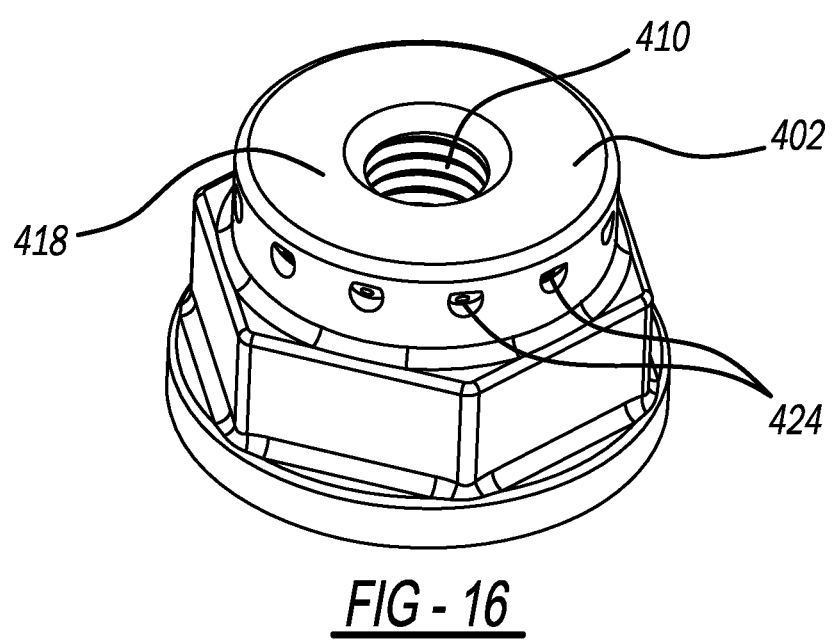
FIG. 16 is a top perspective view of an exemplary retaining cooling nut constructed in accordance to the present disclosure.
Figure 17:
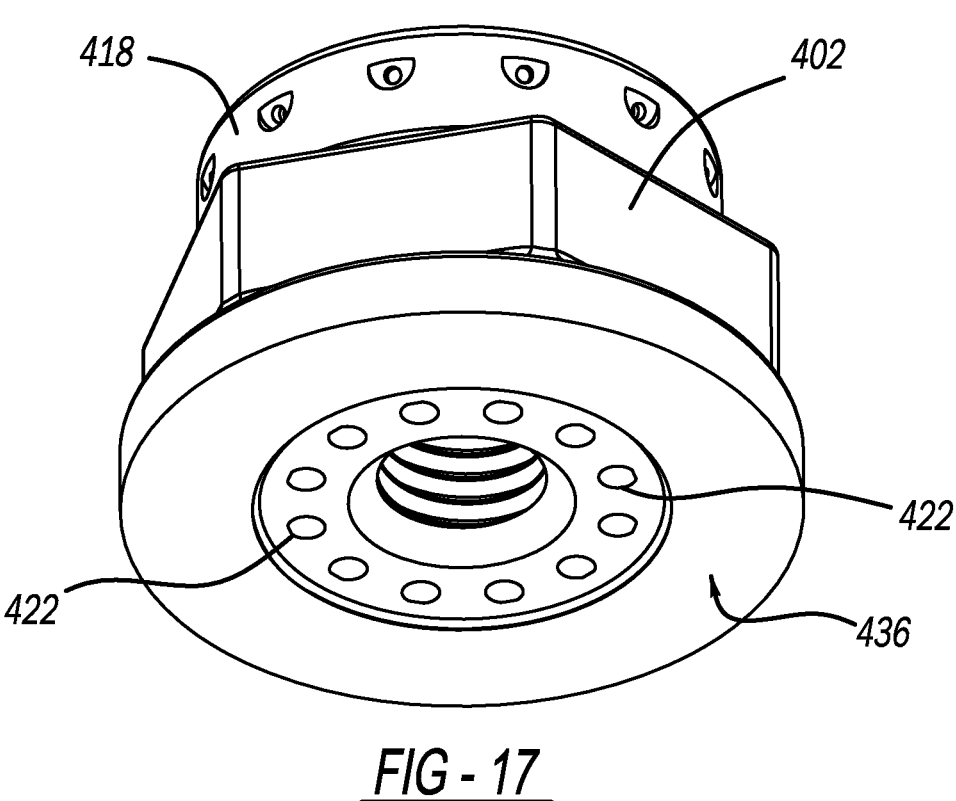
FIG. 17 is a bottom perspective view of the retaining cooling nut of FIG. 16.
Figure 18:
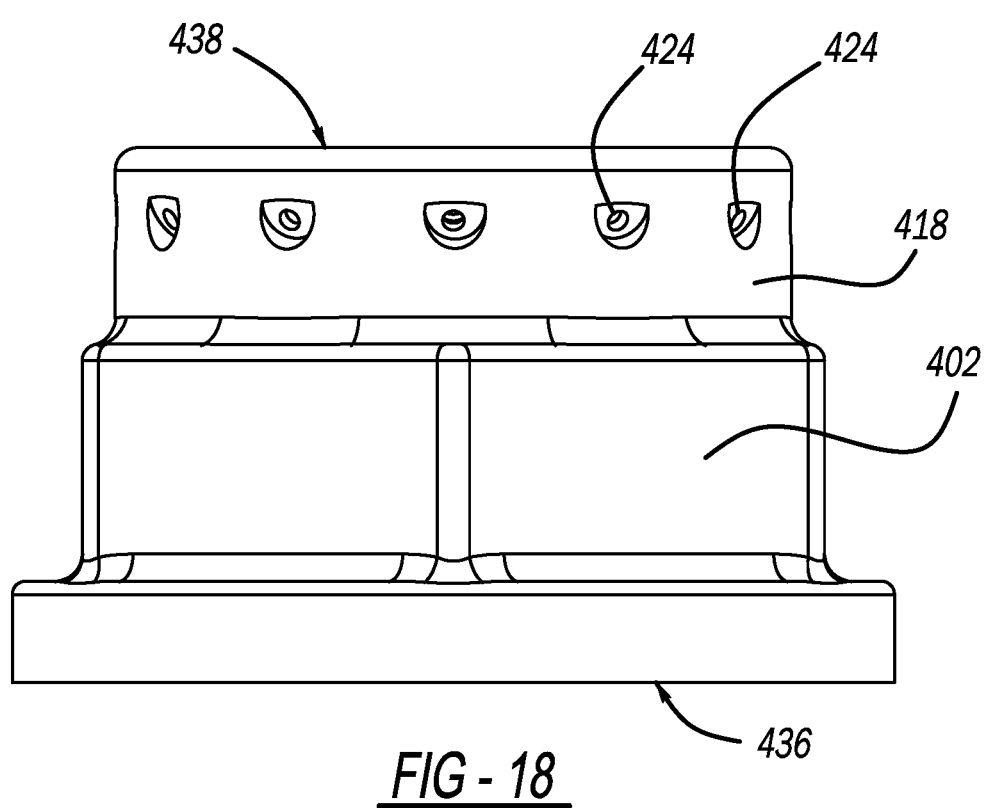
FIG. 18 is a side view of the retaining cooling nut of FIG. 16.

Turning now to FIGS. 12, 14 and 15, a coolant delivery assembly constructed in accordance to one example of the present disclosure is shown and generally identified at reference numeral 400. The coolant delivery assembly 400 generally includes a retaining cooling nut 402, a tool holder or mount 404, a plenum 405, and a coupling member 406 that couples the retaining cooling nut 402 to the mount 404. In the example shown in FIG. 12, the retaining cooling nut 402 secures a cutting tool 408 generally to the mount 404 during cutting of a workpiece 412. The coupling member 406 can be a threaded shaft that threadably mates with a threaded bore 410 defined through the retaining cooling nut 402. The cutting tool 408 can be any cutting tool such as the gear cutters 108, 208, 308 disclosed herein, or other cutting tool.

With particular reference to FIGS. 15-18, additional features of the coolant delivery assembly 400 will now be described. The retaining cooling nut 402 has a nut body 418 that defines a plurality of coolant flow passages 420 defined therein. Each of the coolant flow passages 420 define a coolant inlet and a coolant outlet 422 and 424, respectively. As will become appreciated herein, coolant 440 is directed from a coolant source 426, through the tool holder 404, through the plenum 405, and into the coolant inlets 422, through the coolant flow passages 420 and directed out of the retaining cooling nut 402 from the coolant outlets 424.

The plenum 405 can provide circumferential coolant communication between the tool holder 404 and an engaging end 436 of the retaining cooling nut 402. The plenum 405 can provide a chamber that facilitates full 360 degree coolant supply to the retaining cooling nut 402. In some examples, the coolant 440 can be configured to flow through the mount 404 from the coolant source 426 to the retaining cooling nut 402. Other configurations are contemplated for providing coolant to the cooling retaining nut 402.

With particular reference to FIG. 15, each of the coolant flow passages 420 define a linear portion 432 and an arcuate portion 434. The linear portions 432 generally communicates the coolant 440 from the engaging end 436 of the retaining cooling nut 402 toward an opposite end 438 of the retaining cooling nut 402. The arcuate portions 434 generally route the coolant 440 from the linear portions 432 in a direction toward the cutting tool 408. The coolant flow passages 420 are configured to direct streams of coolant 440 onto a face 444 of the cutting tool 408. FIGS. 19 and 20 show the retaining cooling nut 402 and cutting tool 408 together.

The delivery of coolant directly to the cutting edge or face 444 yields a profound improvement of chip evacuation over conventional arrangements. The coolant delivery assembly 400 virtually eliminated a significant issue of chip re-cutting during the machining process. Chip re-cutting occurs when a fragment of metal (cutting chip) does not exit the cutting zone and gets pulled into the cutting zone a second time. This creates extreme tool pressure and can fracture the edge of the tooth resulting in a catastrophic failure of the tool. The coolant delivery assembly 400 that utilizes the retaining cooling nut 402 to both deliver coolant and secure the cutting tool creates a more compact design. This facilitates machining into tight workpiece clearances which leads to a more compact component design.

With reference to FIG. 13, a coolant delivery assembly 500 constructed in accordance to one prior art example is shown. The coolant delivery assembly 500 generally includes a deflector 510 that is configured to deflect coolant sprayed generally upward back toward the cutting tool 408. The coolant delivery assembly 500 can be inefficient at directing the coolant flow. Cycle time and tool life of the coolant deliver assembly 500 are not cost effective. In particular, the re-cutting of chips slows down the machining process to make sure all the chips were evacuated. Cycle time using the coolant delivery assembly 400 is reduced by around 35% and tool wear is stabilized at around 30% of a typical wear value compared to conventional systems such as shown in FIG. 13.

The foregoing description of the many examples has been provided for purposes of illustration and description. It is not intended to be exhaustive or to limit the disclosure. Individual elements or features of a particular aspect are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A coolant delivery assembly configured for use with a gear cutter tool that cuts gear teeth into a workpiece to form a gear, the coolant deliver assembly comprising:

a retaining cooling nut having a nut body that defines a plurality of coolant flow passages therein, the nut body comprising an engaging end and an opposite end that is opposite the engaging end, the engaging end being configured to engage the gear cutter tool;

a tool holder that supports the gear cutter tool; and a coupling member that couples the retaining cooling nut to the tool holder;

wherein the retaining cooling nut is configured to receive coolant and deliver the coolant through the plurality of coolant flow passages and direct the coolant toward the gear cutter tool;

wherein each flow passage of the plurality of flow passages defines a coolant inlet and a coolant outlet, wherein each coolant inlet is defined at the engaging end; and wherein the plurality of coolant flow passages each define a linear portion and an arcuate portion, wherein the linear portions communicate coolant from the engaging end toward the opposite end.

2. The coolant delivery assembly of claim 1 wherein the arcuate portions route the coolant from the linear portions in a direction toward the cutting tool away from the opposite end.

3. The coolant delivery assembly of claim 1, further comprising: a plenum disposed between the tool holder and the engaging end of the retaining cooling nut, wherein the plenum is configured to provide circumferential coolant communication between the tool holder and the engaging end of the retaining cooling nut.

4. The coolant delivery assembly of claim 1 wherein the retaining cooling nut secures the gear cutter tool to the tool holder.

5. The coolant delivery assembly of claim 1, further comprising: a coupling member comprising a threaded shaft that threadably mates with a threaded bore defined in the retaining cooling nut.

6. The coolant delivery assembly of claim 1, further comprising: the gear cutter tool, wherein the gear cutter tool has a plurality of cutting teeth, each cutting tooth of the plurality of cutting teeth having a tooth face that defines a tooth face angle relative to the workpiece during cutting into the workpiece wherein the tooth face angle is non-parallel relative to the workpiece.

7. The gear cutter tool of claim 6 wherein the tooth face angle is sloped to the left relative to a rotational axis of the gear cutter tool.

8. A gear cutter tool for cutting internal gear teeth into a workpiece to form a gear, the gear cutter tool comprising:

a gear cutter tool having a plurality of cutting teeth, each cutting tooth of the plurality of cutting teeth having a tooth face that defines a tooth face angle relative to the workpiece during cutting into the workpiece wherein the tooth face angle is non-parallel relative to the workpiece;

wherein the tooth face angle is sloped to the left relative to a rotational axis of the gear cutter tool, as viewed from a side direction perpendicular to the rotational axis.

* * * * *